United States Patent [19]

deJong et al.

[11] 4,196,173

[45] Apr. 1, 1980

[54] PROCESS FOR REMOVING MERCURY FROM A GAS

[75] Inventors: Geert J. deJong, Boekelo; Hendrik J. Vos, Hengelo, both of Netherlands

[73] Assignee: Akzo NVV., Arnhem, Netherlands

[21] Appl. No.: 946,861

[22] Filed: Sep. 29, 1978

[30] Foreign Application Priority Data

Sep. 29, 1977 [NL] Netherlands ........................ 7710632

[51] Int. Cl.² .......................................... B01D 53/34
[52] U.S. Cl. ..................................... 423/210; 423/72
[58] Field of Search ............ 423/210 M, 491; 204/99; 55/72, 74

[56] References Cited

U.S. PATENT DOCUMENTS

| | | | |
|---|---|---|---|
| 3,755,989 | 9/1973 | Fornoff et al. | 55/72 |
| 3,849,267 | 11/1974 | Hilgen et al. | 204/99 |

*Primary Examiner*—Earl C. Thomas
*Attorney, Agent, or Firm*—Stevens, Davis, Miller & Mosher

[57] ABSTRACT

Mercury is removed from gases containing mercury vapor by passing the gases continuously through a bed of activated carbon on which a halogen is adsorbed. The bed may have a thickness of at most 5 cm. The chlorine content of the active carbon is maintained between 5% and 12% by weight. This is preferably effected by adding chlorine to the gases in an amount such that the carbon is caused to absorb a quantity thereof which equals the quantity that is consumed during the adsorption of mercury.

7 Claims, No Drawings

PROCESS FOR REMOVING MERCURY FROM A GAS

This invention relates to a process for removing mercury from gases contaminated with mercury vapor by contacting these gases with activated carbon on which a halogen is adsorbed.

A process of the general type indicated above is known from, inter alia, U.S. Pat. Nos. 1,984,164 and 3,849,267. According to the earlier of these patents, a halogen, more particularly iodine, is adsorbed on the carbon, whereas according to the later of the two patents a gas containing mercury and chlorine is passed over activated carbon, as a result of which the mercury content of the gas can be reduced to 0.01 mg/m$^3$.

Moreover, from Soviet Chemical Industry 1972 (No. 8) p. 535–536, and from Tsvet. Metally, 1958 (31) p. 31–37, carbon loaded with chlorine is used as an adsorbent of mercury-containing gases. In accordance with these publications, the carbon contains not more than 4% chlorine based on the carbon weight. For practical purposes, the methods described are not attractive because the filter thicknesses required are unacceptably high or the residual concentrations of mercury in the gas are too high.

Applicant has found that the long-term effectiveness of these known methods is very much dependent on the halogen content of the activated carbon and that a process for the continuous removal of mercury vapor from large volumes of gas can be practical commercially only if the activated carbon contains chlorine in an amount which is between particular critical limits.

It is therefore an object of this invention to provide an improved process for removing mercury contamination from a gas. Another object of the invention is to provide an improved process for adsorbing mercury vapor from a gas containing it in admixture with other gaseous materials on activated carbon containing an adsorbed halogen. A more specific object of the invention is to provide a process for adsorbing mercury vapor from a gas such as air contaminated therewith on an activated carbon filter which contains chlorine adsorbed on the carbon whereby only relatively thin layers of activated carbon are required.

The foregoing objects and other are accomplished in accordance with the invention, generally speaking by providing a process for removing mercury from a gas containing mercury vapor wherein the gas is flowed through a bed containing activated carbon having from about 5% to about 12% by weight chlorine adsorbed thereon based on the weight of the activated carbon.

The invention thus provides a process for treating a gas to be freed from mercury vapor which involves continuously passing the gas through a bed of activated carbon which may have a maximum thickness of 5 cm, care being taken that during the passage the activated carbon has a chlorine content in the range of from 5 to 12% by weight.

It has been found that the use of a lower chlorine content will result in the bed retaining a low percentage of mercury. A total absence of chlorine will cause this percentage to be lower than 50%; and after a few days it will drop to as low as 3% or less. The total amount of mercury which can be retained by the carbon then will be well below 0.1% mercury, calculated on the weight of the carbon. At a chlorine content which is somewhat lower than the minimum amount required, the percentage of mercury collected will initially be good (over 90% of the mercury present can be collected initially). But this percentage will rapidly decrease to below 60% and the carbon will be found to be irreversibly clogged. In other words the effectiveness of the carbon cannot to restored by a subsequent chlorinating treatment and regeneration of the carbon by removing the mercury collected by it is not feasible.

At a chlorine content above the above-mentioned maximum limit the carbon is found to release much chlorine during the process and, moreover, especially when the gas passed through it contains a high percentage of moisture, the carbon will be attacked, resulting in mechanical weakening; it must therefore be replaced sooner than when the chlorine content is within the above-specified limits.

The chlorine content can be kept between the aforementioned limits in a simple manner by adding such an amount of chlorine to the gas under treatment that the carbon will adsorb therefrom as much chlorine as will be lost from it during the adsorption of the mercury. This loss of chlorine during the adsorption of the mercury is the result on the one hand of desorption of and on the other hand of the formation on the carbon of mercury chloride, and is moreover due to reactions between chlorine and other constituents of the gas, particularly water. It has been found that a stable situation can be reached if the gas contains 15 to 25 atoms of chlorine per atom of mercury in the gas.

To this continuous feeding of chlorine there may be very special advantages. Such is the case when the gases to be treated already contain some chlorine, which will inevitably be present in it in a very low concentration for instance in rooms in which common salt is subjected to hydrolysis. Chlorine need then be added only until the desired level has been reached.

It should be noted that according to U.S. Pat. No. 3,849,267 (column 2, lines 1–10) gas containing mercury and chlorine is contacted with activated carbon. In that case, however, the chlorine content is not controlled; for as minimum concentration of mercury contained in the purified gas 0.01 mg per m$^3$ is mentioned. This points to the fact that the chlorine content of the carbon must have been outside the range required in practicing this invention.

Another particularly attractive way of keeping the chlorine content of the activated carbon within the limits indicated consists in that the carbon is periodically brought into contact with a chlorine-containing gas. In this periodic chlorine make-up it must be insured that the chlorine content of the activated carbon does not temporarily get beyond the limits indicated, in which case the above-described disadvantages may be encountered.

In actual practice it is found that when the chlorine content is made up once a week very favorable results can be obtained. For in one week the collecting capacity of the carbon for mercury is reduced by as little as 5 percent or less.

By subsequently contacting the activated carbon with a chlorine-containing gas the original collecting capacity is restored. The amount of chlorine the activated carbon is made to adsorb when it is periodically treated with a chlorine-containing gas may be, for instance, 0.30–0.40% of the weight of the carbon. It has been found that use of the process according to the invention may lead to very favorable results with gases having a mercury content of about 0.01–0.15 mg/m$^3$.

According to the invention this content may be reduced to 0.001–0.008 mg/m$^3$, which is a level that is quite acceptable under all circumstances and cannot be attained with any of the known processes.

At higher mercury contents of the gas to be purified it is recommended that the air should be subjected first to some other mercury-desorbing process, for instance by washing with a sodium hypochlorite solution or using the method described in U.S. Pat. No. 3,849,267.

Additional advantages of the method of the invention are that the desired result can be obtained with very short contacting times in the range of 25 to 100 milliseconds and that, depending on the initial mercury content and the chosen contacting time, the percentage mercury collected is between 85 and 99%. Owing to the short contacting times, thin (and hence inexpensive) carbon beds may be used. Excellent results are obtained with a carbon bed having a thickness of, for instance, 2 cm. With the process according to the invention it is generally possible with 1 kg of activated carbon to treat gas at a rate of 50 to 200 m$^3$ per hour. In the process according to the invention the effective life of the carbon is extraordinarily long. At a mercury content of the gas of 0.05 mg/m$^3$ and a passage of 100 m$^3$/h per kg of carbon, the expected effective life obtained according to the present invention is over 400 days.

Should the carbon be loaded with mercury, i.e. mercury chloride, to such a degree that its effectiveness will decrease, then it can be regenerated in a simple manner for instance by washing with an aqueous liquid containing chloride ions. In a mercury electrolysis apparatus preferably use is made for this purpose of process liquids, so that the mercury compounds released upon regeneration are fed back into the process and no secondary contamination takes place during regeneration. After the greater part of the mercury present has been removed, the carbon is washed with water to remove any clogging salts. After drying and loading with chlorine the carbon is ready to be used in a new adsorption period.

Regeneration of the carbon loaded with mercury is possible in that the mercury is present on it in the form of mercury chloride which is converted into water-soluble complex compounds in a chloride-containing aqueous solution.

An unduly high moisture content of the gas from which mercury is to be removed should be avoided because the effectiveness of the activated carbon is reduced then and water is collected instead of mercury. It is preferred that the relative humidity should be kept below 75%. The relative humidity can be controlled in such a way that the excess water is isolated by previous cooling or the gas is heated to a temperature such that the desired relative humidity is obtained.

In the process provided by the invention normal activated carbon may be used so there is no need to employ specially prepared carbons or other costly sorbents. Preference is given to the use of extruded carbon granules having a diameter of about 1.5 mm. The process according to the invention may be applied in the removal of mercury from, for instance, hydrogen gas. The process is particularly suitable for the removal of mercury from air which is vented from buildings of manufacturing plants by fans. The mercury content of such air is usually low because people who have to work in it must not be exposed to high mercury concentrations. The volumes of air to be discharged then are therefore generally large.

The process according to the invention is attractive especially in that it provides an inexpensive treatment of very large volumes of air having a low mercury content. As a result, even small environmental pollution by mercury can still be further reduced. If the air to be purified is not dust-free, this does not present any difficulty because the presence of dust does not have any unfavorable influence on the process.

As the usual fans generally have a small head, the air to be vented by them can be passed only through filters having a low resistance. That is why the process according to the invention is so important; for the filters to be used need only have a small thickness.

The invention is further illustrated in the following examples.

EXAMPLE 1

From a room in which sodium chloride is subjected to electrolysis by the amalgamation process, air is withdrawn at a rate of 10.10$^6$ m$^3$ per hour by means of 25 fans.

This air contains mercury vapor in an amount of about 0.05 mg/m$^3$. Per fan this air, which has a relative humidity of 50% at a temperature of 32° C., is passed through a filter bed having a surface area of 37 m$^2$. The air displacement per fan is 40×10$^3$ m/h. The bed is formed by a 1.6 cm thick layer of granules of activated carbon 1.5 mm in diameter. The pressure drop across the filters is less than 10 mm hydrostatic head. The amount of carbon is 358 kg per fan. Before use the carbon is contacted with a chlorine-containing gas until the chlorine content of the carbon is 7% by weight. The air is passed through the filters at a rate of 0.6 m/sec., so that the contacting time is 27.10$^{-3}$ sec. After the air has left the filter, its mercury content is less than 0.004 mg/cm$^3$, so that the effectiveness of the filter under these conditions is more than 92%. After the filter has been in use for a week, its effectiveness has decreased to 89%.

Then air containing 60 mg of chlorine per m$^3$ is passed through the filter for 30 minutes and the free chlorine content of the activated carbon is restored to 7% by weight. Upon the subsequent passage of mercury-containing air the effectiveness of the mercury removal is again found to be more than 92%.

After one year's operation of the system in the above-described way the mercury content of the carbon is 4.3% by weight. The carbon is then regenerated by washing for 10 hours with a concentrated hydrochloric acid solution. Subsequently the hydrochloric acid is removed by washing with water, after which the carbon is dried by passing air through it.

When the carbon is dry (drying time about 1 hour), it is loaded with chlorine up to the original level, after which it is ready again for further adsorption. In an experiment in which the chlorine content is made up when the effectiveness of the mercury removal is 86%, it can be restored to 92% in the above-described way. In an experiment in which the chlorine make-up is not carried out until the effectiveness of the mercury removal has decreased to 84%, it is found that it can no longer be restored to 92% by chlorine make-up. The chlorine content has then been reduced by adsorption to a level such that the decrease has become irreversible.

EXAMPLE 2

From a room in which sodium chloride is subjected to electrolysis by the amalgamation process air is withdrawn in the way described in Example 1. The air is treated in the manner indicated in Example 1, except that the carbon is not periodically brought into contact with a chlorine-containing gas. In this case the chlorine content of the carbon is kept at the desired level by having the fan air continuously contain a small amount of chlorine.

The chlorine content of the air is 0.35 p.p.m.

In this way the effectiveness of the mercury removal can be kept at 92% for a year, with the mercury content of the purified air amounting to less than 0.004 mg/m$^3$.

When the chlorine content of the air has been reduced until the effectiveness is less than 84%, the decrease is found to be irreversible. By increasing the chlorine feed rate it can no longer be restored then to the originally high level.

Although the invention has been described in detail for the purpose of illustration, it is to be understood that such detail is solely for that purpose and that variations can be made therein by those skilled in the art without departing from the spirit and scope of the invention except as it may be limited by the claims.

We claim:

1. In a process for removing mercury gases containing mercury vapor which comprises contacting these gases with activated carbon on which a halogen is adsorbed, the improvement which comprises flowing a gas to be freed from mercury vapor continuously through a bed of activated carbon having a maximum thickness of 5 cm and having chlorine adsorbed thereon, and maintaining the chlorine content of the activated carbon in the range of from 5 to 12% by weight based on the weight of the carbon during the passage of the gas through the activated carbon bed by continuously or periodically supplying the bed with a replenishing amount of chlorine.

2. The process of claim 1, characterized in that the chlorine content of the activated carbon is kept within said limits by admixing the chlorine to be supplied to the carbon bed with the gas which is to be freed from mercury vapor and then flowing the resulting gas mixture through the bed thereby replacing the chlorine as it is lost during the adsorption of the mercury.

3. The process of claim 2, characterized in that the amount of chlorine admixed with the gas is adjusted so as to have a gas mixture containing 15 to 25 atoms of chlorine per atom of mercury.

4. The process of claim 1, characterized in that the chlorine content of the activated carbon is kept between said limits by periodically contacting the carbon with a chlorine-containing gas.

5. A process for improving the adsorption of mercury vapor by a filter from a gas passing through said filter containing activated carbon having chlorine adsorbed thereon which comprises supplying the activated carbon filter with a replenishing amount of chlorine thereby maintaining the chlorine content of the activated carbon between about 5% and 12% by weight based on the weight of activated carbon.

6. The process of claim 5 wherein the gas from which mercury is removed contains chlorine in an amount which replaces chlorine lost by the filter to maintain the chlorine content at all times within the stated percentages.

7. The process of claim 5 wherein the chlorine content of the activated carbon is maintained between the stated percentages and the mercury adsorption of the filter is not permitted to drop to below 85%.

* * * * *